US007006430B2

(12) United States Patent
Harada et al.

(10) Patent No.: US 7,006,430 B2
(45) Date of Patent: **\*Feb. 28, 2006**

(54) RECEIVER, RECEIVING METHOD, AND RECORDING MEDIUM WHICH RECORDS PROGRAM FOR RECEIVING DATA SIGNALS

(75) Inventors: Hiroshi Harada, Kanagawa (JP); Masayuki Fujise, Kanagawa (JP); Ryuuhei Funada, Kanagawa (JP); Manabu Sawada, Aichi (JP)

(73) Assignees: National Institute of Information and Communications Technology, Incorporated Administrative Agency, Tokyo (JP); Denso Corporation, Aichi (JP)

( * ) Notice: Subject to any disclaimer, the term of this patent is extended or adjusted under 35 U.S.C. 154(b) by 916 days.

This patent is subject to a terminal disclaimer.

(21) Appl. No.: 09/865,165

(22) Filed: May 24, 2001

(65) Prior Publication Data

US 2002/0018528 A1 Feb. 14, 2002

(30) Foreign Application Priority Data

May 25, 2000 (JP) ............................. 2000-154177

(51) Int. Cl.
*H04J 11/00* (2006.01)
(52) U.S. Cl. ..................... 370/210; 370/203; 375/340
(58) Field of Classification Search ........ 370/203–210, 370/338
See application file for complete search history.

(56) References Cited

U.S. PATENT DOCUMENTS 5,513,215 A 4/1996 Marchetto et al.

| 5,719,899 A | * | 2/1998 | Thielecke et al. .......... 375/144 |
| 5,802,117 A | | 9/1998 | Ghosh |
| 6,487,253 B1 | * | 11/2002 | Jones et al. ................. 375/260 |

(Continued)

FOREIGN PATENT DOCUMENTS

| EP | 93309390.8 | 7/1994 |
| EP | 94300081.0 | 7/1994 |
| EP | 0 998 068 A | 3/2000 |
| GB | 2 271 916 A | 4/1994 |

(Continued)

OTHER PUBLICATIONS

Bossert et al., "Channel Estimation and Equalization in Orthogonal Frequency Division Multiplexing Systems", Mobile Kommunikation, Vorträge de ITG-Fachberichte, Berlin, Germany (Sep. 26, 1995) vol. 135:485-492.

(Continued)

*Primary Examiner*—Frank Duong
*Assistant Examiner*—Michael J Moore
(74) *Attorney, Agent, or Firm*—Mitchell P. Brook, Esq.; Luce, Forward, Hamilton & Scripps LLP (57) ABSTRACT

A receiving section outputs a received signal. An estimation section estimates transmission path characteristics, using the received signal and a modulated data signal. A compensation section outputs a compensated data signal, using the received signal and the transmission path characteristics. A demodulation section demodulates a modulated data signal, using the compensated data signal. A modulation section modulates a modulated data signal, using the demodulated data signal. The estimation section begins the estimation by comparing a result obtained by modulating known-data and a known-data portion of the received signal. The compensation section compensates for a non-compensated data signal portion, using the estimated transmission path characteristics.

22 Claims, 7 Drawing Sheets

U.S. PATENT DOCUMENTS

| | | | |
|---|---|---|---|
| 6,795,392 B1 * | 9/2004 | Li et al. | 370/210 |
| 2001/0036235 A1 * | 11/2001 | Kadous | 375/341 |
| 2002/0126774 A1 * | 9/2002 | Harada et al. | 375/340 |

FOREIGN PATENT DOCUMENTS

| | | | |
|---|---|---|---|
| JP | 61161056 A | 7/1986 | |
| JP | 2000286819 A | 10/2000 | |

OTHER PUBLICATIONS

Mignone et al., "CD3-OFDM: A New Channel Estimation Method to Improve the Spectrum Efficiency in Digital Terrestrial Television Systems", International Broadcasting Convention XX, (Sep. 14, 1995) Conference Publication No. 413, pp. 122-128.

* cited by examiner

RECEIVER, RECEIVING METHOD, AND RECORDING MEDIUM WHICH RECORDS PROGRAM FOR RECEIVING DATA SIGNALS

BACKGROUND OF THE INVENTION

1. Field of the Invention

The present invention relates to a receiver, signal receiving method, and information recording medium which records a program for receiving data signals. More particularly, the present invention relates to a receiver and method for desirably estimating transmission path characteristics when to transmit a signal including a data signal and a known signal, compensating for the signal, and suitably obtaining the transmitted data signal, and also to a computer readable recording medium which records a program for realizing the receiver and method in a computer.

2. Description of the Related Art

In recent years, in the field of radio communications, it is more demanded that a large amount of data are transmitted. In response to this demand, various techniques have been studied.

Since delayed waves may occur as a result of reflection caused by an electro-magnetic wave obstacle in a transmission path, it is necessary to eliminate any undesired effects of the occurring delayed waves. In consideration of this, the following technique is proposed.

On the transmitter side, data symbols to be transmitted are modulated together with a known symbol, so as to be transmitted.

On the receiver side, a portion of a received signal which corresponds to the known symbol is compared with a resultant signal obtained by modulating the known symbol, so as to obtain an impulse response. Thus obtained impulse response is estimated as transmission path characteristics. Further, a portion of the received signal which corresponds to the data symbol is compensated using the estimated transmission path characteristics, and demodulated, so as to obtain the transmitted data symbol.

Such a technique is used in the OFDM (Orthogonal Frequency Division Multiplexing) communications.

To transmit a large amount of data through a mobile radio LAN (Local Area Network), it is desirable that the length of the transmitted data symbol is larger than the length of the known symbol as much as possible. In the field of mobile data communications, transmission contexts between a terminal and another terminal and between a terminal and a base station may widely change.

According to the above-described technique, the transmission path characteristics change as time goes by. In such circumstances, the estimated value of the transmission path characteristics may be quite far from the actual contexts while transmitting a data symbol which is large in length. A problem arises in that the data can not sufficiently be compensated.

SUMMARY OF THE INVENTION

The present invention has been made in consideration of the above. It is accordingly an object of the present invention to provide a receiver and method for desirably estimating transmission path characteristics when to transmit a signal including a data signal and a known signal, compensating for the signal, and suitably obtaining the transmitted data signal, and also to a computer readable recording medium which records a program for realizing the receiver and method in a computer.

In order to accomplish the above object, according to the first aspect of the present invention, there is provided a receiver comprising a receiving section, an estimation section, a compensation section, a demodulation section, and a modulation section.

The receiving section receives a resultant signal obtained by transmitting a transmission signal obtained by modulating a signal including a known signal and a data signal, and output the received resultant signal as a received signal.

The estimation section estimates transmission path characteristics.

The compensation section compensates for a portion of the received signal, which corresponds to the data signal, using the transmission path characteristics estimated at the compensation section, and outputs the compensated signal as a compensated data signal.

The demodulator demodulates the compensated data signal, and outputs the demodulated signal as a demodulated data signal.

The modulation section modulates the demodulated data signal, and outputs the modulated signal as a modulated data signal.

The estimation section (a) compares a portion of the received signal which corresponds to the known signal with a resultant signal obtained by modulating the known signal, and (b) compares the portion of the received signal which corresponds to the data signal with a portion of the modulated data signal which corresponds to the data signal, thereby to estimate the transmission path characteristics.

In the receiver of this invention, a portion of the received signal which has not yet been compensated may be compensated using a portion of the transmission path characteristics which have already been estimated.

In the receiver of this invention, the estimation section may output impulse responses which are obtained by performing (a) and (b), as transmission path characteristics.

The modulation section may modulate the known signal, and outputs the modulated signal as a modulated-known signal.

The estimation section may perform (a) and (b), using the modulated-known signal, as a resultant signal obtained by modulating the known signal.

In the receiver of this invention, the transmission signal may be obtained by modulating the signal including the known signal and data signal, using the multi-carrier transmission technique, and include a divider.

The divider may divide the received signal at each carrier frequency according to the multi-carrier transmission technique, and outputs the divided signals as a group of received signals.

The receiver may use the group of received signals in place of the received signal, a group of compensated data signals in place of the compensated data signal, a group of demodulated data signals in place of the demodulated data signal, a group of modulated data signals in place of the modulated data signal, and number of the groups of compensated data signals, demodulated data signals and modulated data signals being equal to or smaller than number of the group of received signals.

In the receiver of this invention, carrier frequencies according to the multi-carrier transmission technique may overlap each other, and the divider may divide the received signal using FFT (Fast Fourier Transformation).

The receiver of this invention may further include an output section.

The output section may restore a data signal included in the transmission signal before being modulated, to its original signal using the group of demodulated data signals, and output the demodulated data signal as a transmission data signal.

In the case where OFDM (Orthogonal Frequency Division Multiplexing) is employed as a multi-carrier transmission technique, the transmission data signal is parallel-serial converted so as to be restored to its original signal.

In order to accomplish the above object, according to the second aspect of the present invention, there is provided a data signal receiving method comprising the steps of receiving, estimating, compensating, demodulating, and modulating.

In the receiving step, a resultant signal obtained by transmitting a transmission signal obtained by modulating a signal including a known signal and a data signal may be received, and output as a received signal.

In the estimating step, transmission path characteristics may be estimated.

In the compensating step, a portion of the received signal which corresponds to the data signal may be compensated using the estimated transmission path characteristics, and output as a compensated data signal.

In the demodulating step, the compensated data signal may be demodulated, and output as a demodulated data signal.

In the modulating step, the demodulated data signal may be modulated, and output as a modulated data signal.

The step of estimating the transmission path characteristics may include the steps of (a) comparing a portion of the received signal which corresponds to the known signal with a resultant signal which is obtained by modulating the known signal, and (b) comparing the portion of the received signal which corresponds to the data signal with a portion of the modulated data signal which corresponds to the data signal, thereby estimating the transmission path characteristics.

In the receiving method, a portion of the received signal which has not yet been compensated is compensated using a portion of the transmission path characteristics which have already been estimated.

In the receiving method of this invention, in the estimating step, impulse responses obtained by performing the steps (a) and (b) may be output as transmission path characteristics.

In the modulating step, the known signal may be modulated, and output as a modulated-known signal.

The estimating step may include the steps (a) and (b) while using a resultant signal which is obtained by modulating the known signal.

In the method of this invention, the transmission signal may be obtained by modulating a signal including a known signal and a data signal, using a multi-carrier transmission technique. The method may further include a dividing step.

In the dividing step, the received signal may be divided at each carrier frequency, using the multi-carrier transmission technique, and output as a group of received signals.

The method may use the group of received signals in place of the received signal, a group of compensated data signals in place of the compensated data signal, a group of demodulated data signals in place of the demodulated data signal, a group of modulated data signals in place of the modulated data signal, and number of the groups of compensated data signals, demodulated data signals and modulated data signals being equal to or smaller than number of the group of received signals.

In the receiving method of this invention, carrier frequencies according to the multi-carrier transmission technique may overlap each other, and the step of dividing may include a step of dividing the received signal using FFT (Fast Fourier Transformation).

In the step of outputting, a data signal included in the transmission signal before being modulated may be restored to its original signal, using the group of demodulated data signals, and output as a transmission data signal.

For example, in the case where OFDM (Orthogonal Frequency Division Multiplexing) is employed as a multi-carrier transmission technique, the transmission data signal is parallel-serial converted so as to be restored to its original signal.

A program for realizing the receiver and receiving method according to the present invention may be stored in a recording medium, such as a compact disk, a floppy disk, a hard disk, a magneto-optical disk, a digital versatile disk, a magnetic tape, or a semiconductor memory.

The program stored in the recording medium according to the present invention may be executed by a data processor being equipped with a storage device, a computing unit, output device, and the like, such as a general-purpose computer, a video game device, a PDA (Personal Data Assistants), and a cellular phone, to realize the above described receiver and receiving method.

The recording medium storing the program according to the present invention may be distributed or merchandized being separated from the data processor.

BRIEF DESCRIPTION OF THE DRAWINGS

The object and other objects and advantages of the present invention will become more apparent upon reading of the following detailed description and the accompanying drawings in which.

DETAILED DESCRIPTION OF THE PREFERRED EMBODIMENTS

Embodiments of the present invention will now be described. One skilled in the art may be able to propose modified embodiments each of which include all or some elements described in the following embodiments of the present invention. Such modified elements will be included in the scope of the present invention, because the following embodiments of the present invention do not limit the scope of the present invention but just explain the present invention.

First Embodiment

Figure 1:
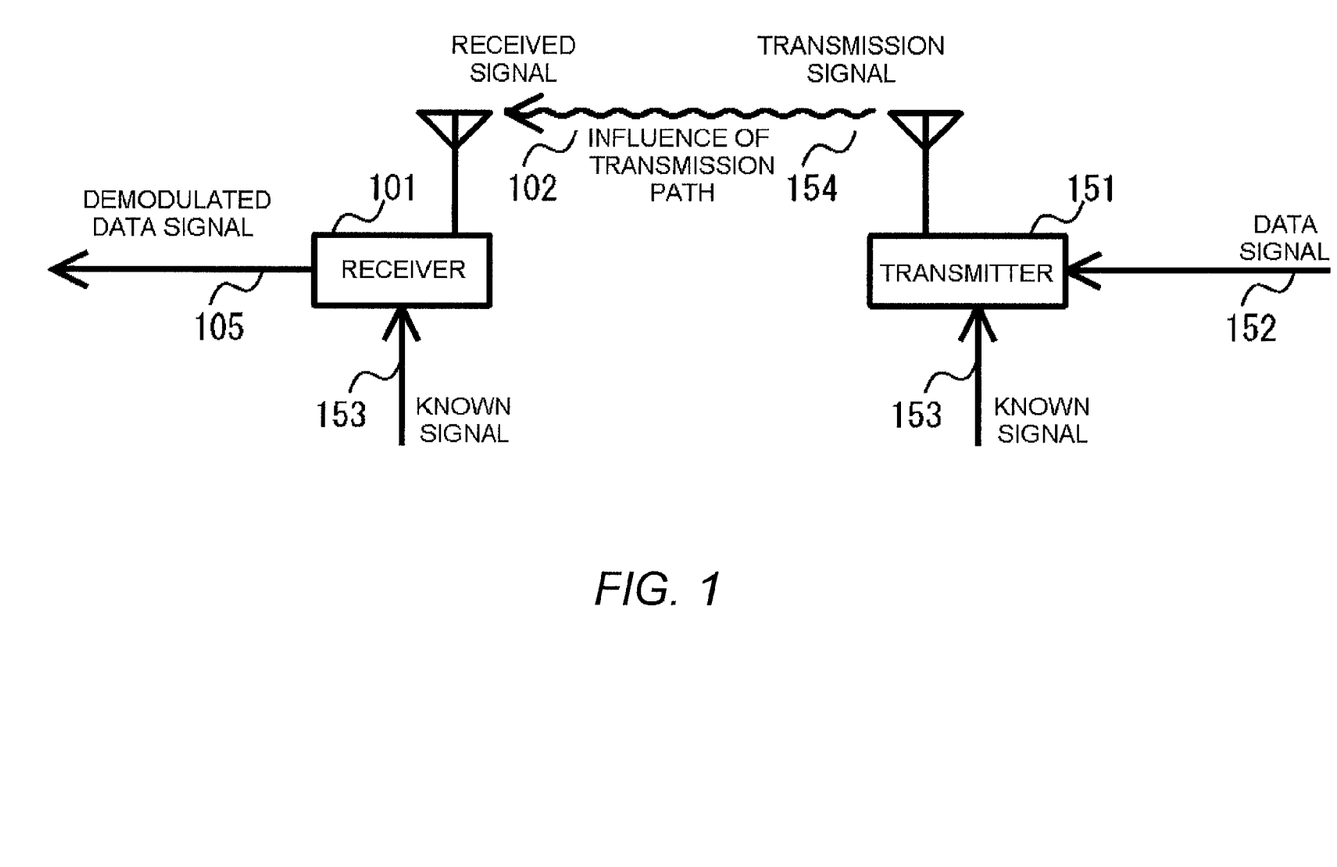
FIG. 1 is an exemplary diagram showing the relationship between a receiver according to the first embodiment of the present invention and a transmitter which transmits a signal to the receiver.

FIG. 1 is an exemplary diagram showing the relationship between a receiver according to the first embodiment of the present invention and a transmitter which transmits a signal to the receiver.

A transmitter 151 accepts a data signal 152, modulates the data signal 152 and a known signal 153 to a transmission signal 154, and sends the transmission signal 154 to a receiver 101.

The transmission signal 154 changes in its form by the influence of a transmission path.

The receiver 101 receives a resultant signal after changed, as a received signal, estimates changeable transmission path characteristics, using a received signal 102 and the known signal 153, and obtains a demodulated-data signal 105 as a transmitted signal.

Figure 2:
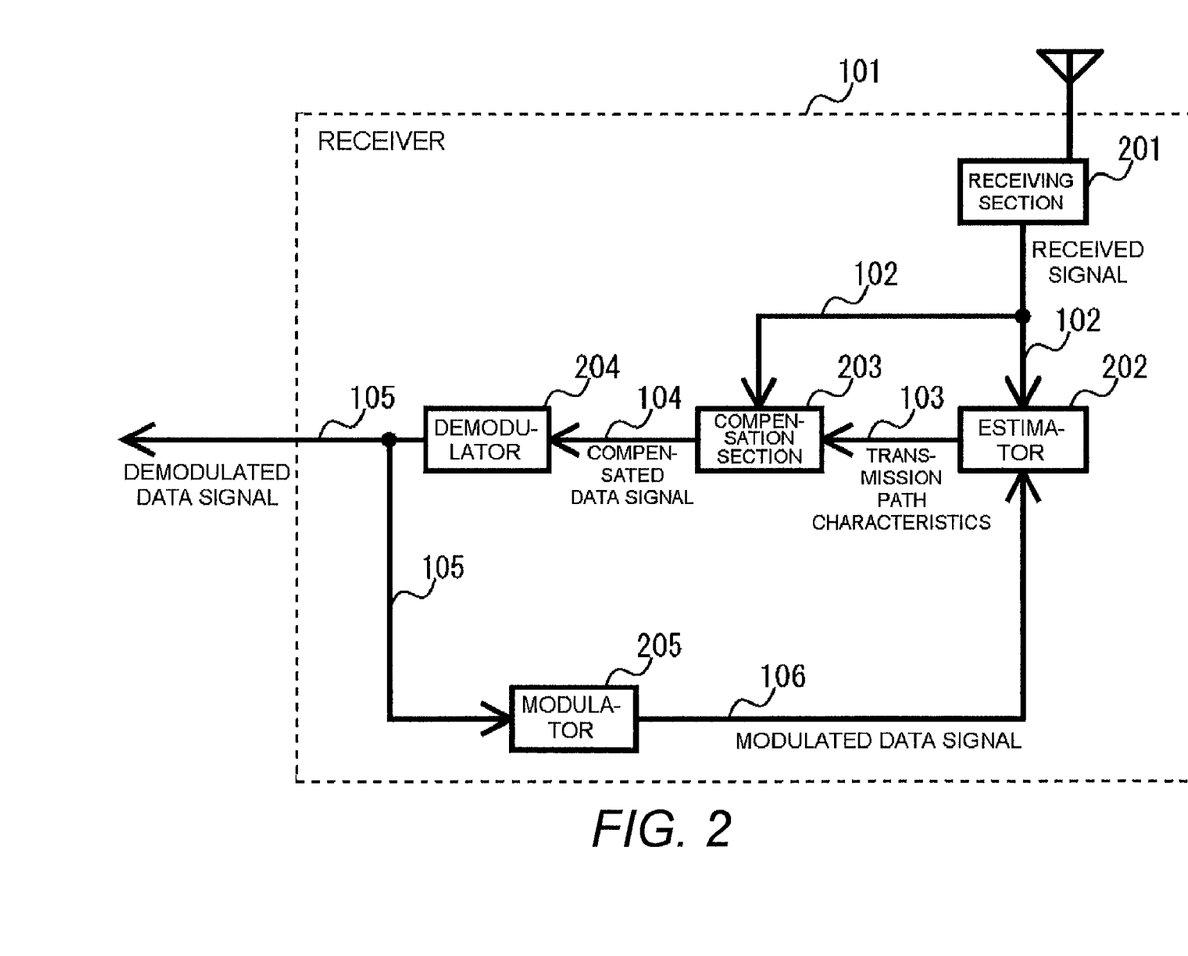
FIG. 2 is an exemplary diagram showing the schematic structure of the receiver according to the first embodiment.

FIG. 2 is an exemplary diagram showing the schematic structure of the receiver according to the first embodiment. The same reference numerals as those of the elements shown in FIG. 1 are affixed to the same component elements of the receiver shown in FIG. 2.

The receiver 101 comprises a receiving section 201, an estimator 202, a compensation section 203, a demodulator 204, and a modulator 205.

The receiving section 201 receives the signal which is transmitted and changed through a transmission path, and outputs the signal as the received signal 102.

The estimator 202 estimates transmission path characteristics 103, using a technique as will be explained later.

The compensation section 203 compensates for a portion of the received signal 102, which corresponds to a data signal thereof, and outputs the compensated portion of the received signal 102, as a compensated data signal 104.

The demodulator 204 demodulates the compensated data signal 104, and outputs the signal 104, as a demodulated data signal 105. This demodulated data signal 105 is a data signal sent from the transmitter 151.

The modulator 205 modulates the demodulated data signal 105, and outputs the signal 105, as a modulated data signal 106.

Figure 3:
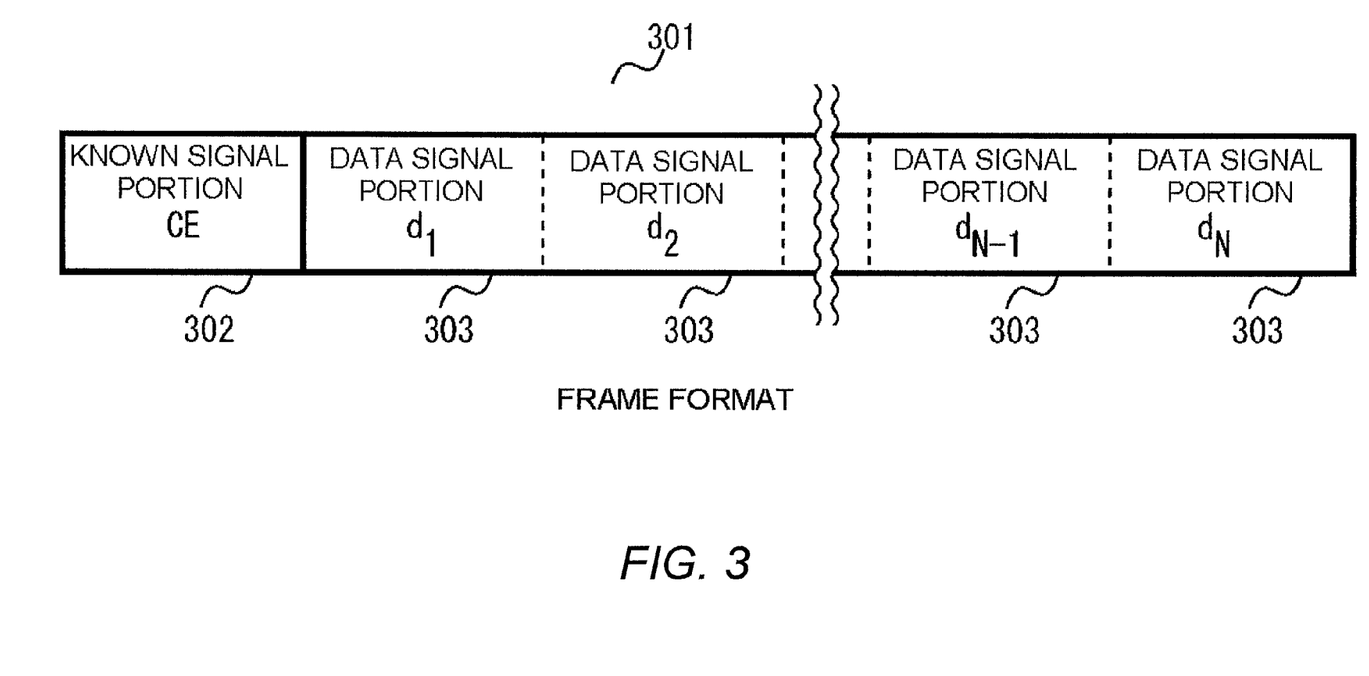
FIG. 3 is an explanatory diagram showing the frame format of a known signal, which is transmitted by the receiver of the first embodiment of the present invention, and a data signal.
Figure 4:
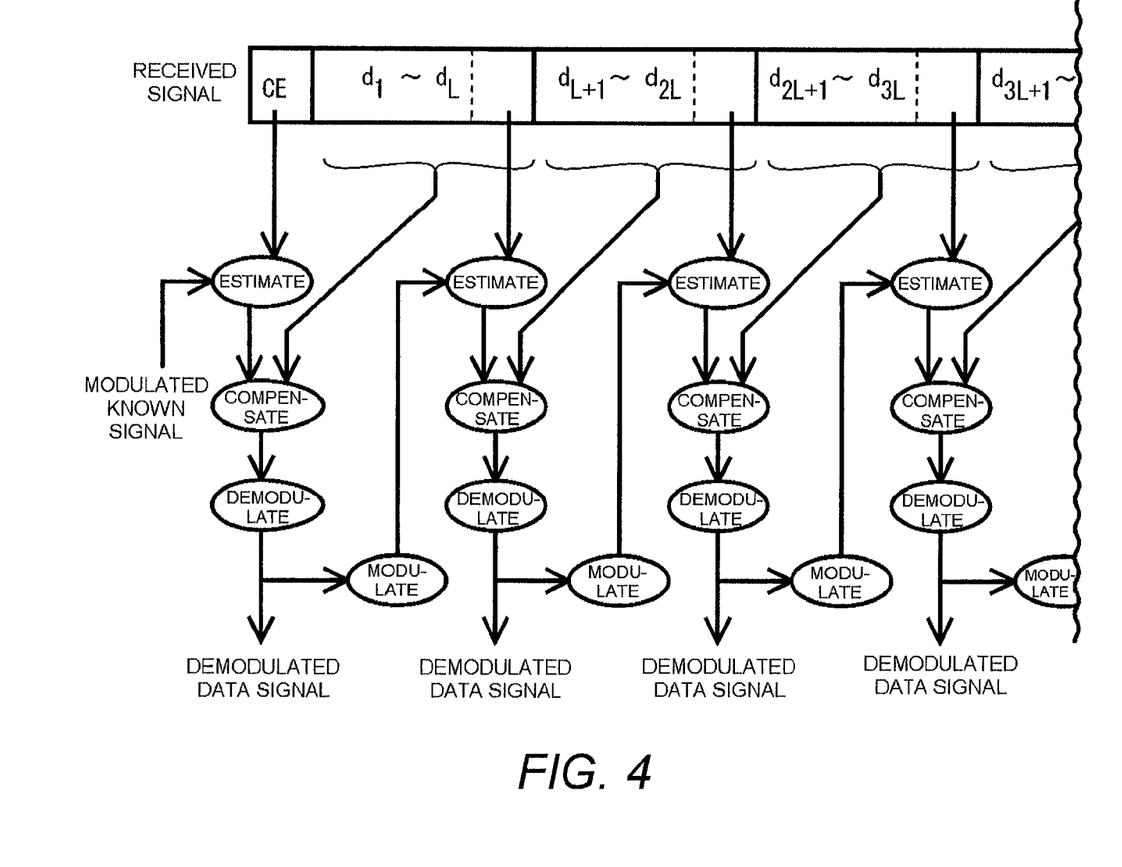
FIG. 4 is an explanatory diagram for explaining a process for estimating transmission path characteristics, which is carried out by an estimator included in the receiver of the first embodiment.

FIG. 3 is an explanatory diagram showing a frame format of a to-be-transmitted known signal and a data signal. FIG. 4 is an explanatory diagram showing a process for estimating transmission path characteristics, which is carried out by the estimator 202.

One frame 301 includes a known-signal portion 302 for storing the known signal 153 and a data signal portion 303 for storing the data signal 152. The data signal portion 303 is divided into an "N" number of data signal portions $303d_1$, $303d_2$, $303d_3$, . . . , $303d_N$, in the unit of packets $d_1$, $d_2$, $d_3$, . . . , $d_N$. As will specifically be described later using an experimental result, even if the length of each of the data signal portions $303d_1$, . . . $303d_N$ is larger than the length of the known-signal portion 302, the receiver 101 according to this embodiment can obtain a preferable experimental result.

The estimator 202 divides the known signal 302 of the received signal 102 by a resultant value obtained by modulating the known signal 302, so as to obtain an impulse response corresponding to a quotient of the division. This impulse response is an estimated value of the transmission path characteristics at the time the known signal 153 has just transmitted.

In terms of a packet adjacent or close to the known-signal portion 302, the estimated value is not so far away from the actual transmission path characteristics. The compensation section 203 compensates for those data signal portions $303d_1$, . . . , $d_L$ (L<N), of the data signal portions $303d_1$, . . . , $d_N$, using the impulse response obtained using the data signal portion 302.

After the corresponding data signal portions 303 are compensated, the demodulator 204 demodulates the data signal portions $303d_1$, . . . , $d_L$, thereby to obtain thus demodulated data signal portions $303d_1$, . . . , $d_L$, included in the data signal 152.

Further, likewise the case of the known signal 153, the last "M" (M≦L) number of the data signal portions 303 are used as data for estimating the transmission path characteristics. Hence, the modulator 205 modulates those data signal portions $d_{L-M+1}$, . . . , $d_L$, which are included in the data signal 152, so as to obtain the modulated data signal 106.

The estimator 202 divides the data signal portions $303d_{L-M+1}$, . . . , $303d_L$ of the received signal 102 respectively by those data signal portions $d_{L-M+1}$, . . . , $d_L$ of the modulated data signal 106, so as to obtain impulse responses corresponding to the respective quotients of the divisions. Thus obtained impulse responses are estimated values of the transmission path characteristics at the time the data signal portions $d_{L-M+1}$, . . . , $d_L$, are transmitted.

It can be assumed that the estimated value corresponding to the data signal portion $d_{L+1}$, . . . , $d_{nL}$, which are close to the last compensated packets $d_{L-M+1}$, . . . , $d_L$, is not so far from the actual transmission path characteristics. Now, the data signal portions $303d_{L+1}$, . . . , $303d_{2L}$ are to be compensated using the above estimated values.

Similarly, the following procedures (a), (b), and (c) are repeated until the data signal portions $303d_1$, . . . $d_N$ are entirely demodulated.

(a) Using the estimated transmission path characteristics corresponding to the data signal portions $303d_{(i-1)L-M+1}$, . . . , $d_{iL}$, the compensation section 203 compensates for the data signal portions $303d_{iL+1}$, . . . , $d_{(i+1)L}$, so as to obtain the demodulated data signal 105.

(b) The modulator 205 modulates the data signal portions $d_{(i+1)L-M+1}$, . . . , $d_{(i+1)L}$ of the demodulated data signal 105, so as to obtain the modulated data signal 106. Using this obtained modulated data signal 106, the estimator 202 estimates the transmission path characteristics.

(c) An integer i is incremented by one.

The integers N, L, and M can be arbitrary values which satisfy the above conditions, or can be any adequate values obtained as a result of experiment adopting an actual device, etc.

In the case where to estimate the transmission path characteristics using a plurality of packets, i.e. in the case where M>1, a plurality of impulse responses for the respective packets can be derived. Then, an average of the plurality of impulse responses can be obtained. From the average of the plurality of impulse responses, the weighted average may be obtained, wherein the larger the subscript of the data signal portions $d_{(i+1)L-M+1}, \ldots, d_{(i+1)L}$, the more weight contributed.

The so-far described signal processing may be carried out using not only a high-speed computer, an electronic circuit, which operates under the control of software such as a DSP (Digital Signal Processor), FPGA (Field Programmable Gate Array), etc., but also an ASIC (Application Specific Integrated Circuit).

The technique for modulating and demodulating the data signal is arbitrary, and is not limited to OFDM (Orthogonal Frequency Division Multiplexing), as will be explained later.

Second Embodiment

Figure 5:
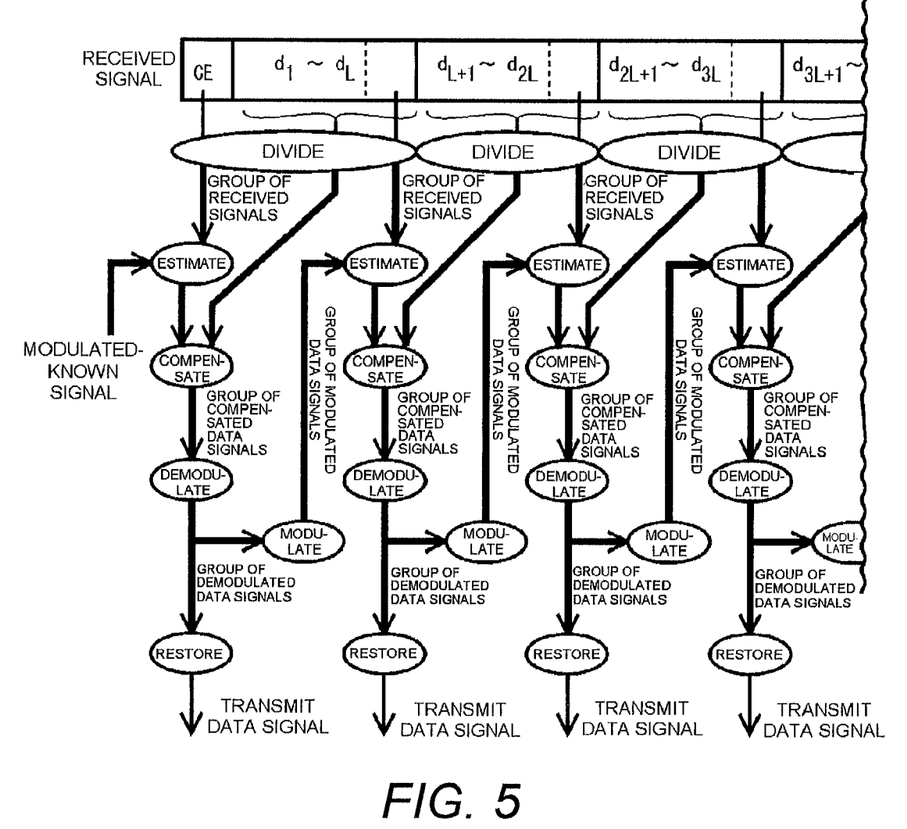
FIG. 5 is an explanatory diagram for explaining a process for estimating transmission path characteristics, which is carried out by an estimator included in a receiver according to the second embodiment.

In the above-described embodiment, the technique for the modulating and demodulating the data signal is not limited. However, in the second embodiment, explanations will now be made to the modulating and demodulating of the data signal using a multi-carrier communications technique (including orthogonal frequency division multiplexing communications). FIG. 5 is an explanatory diagram for explaining a process for estimating transmission path characteristics, which is carried out by the estimator 202 included in the receiver according to this embodiment.

A signal received by the receiver is divided into a plurality of signal portions at each carrier frequency. In the case of orthogonal frequency division multiplexing communications, the received signal is divided into a plurality of signal portions at each carrier frequency, using FFT (Fast Fourier Transformation). Additionally, in the case of multi-carrier communications wherein the bandwidths of modulated signals do not overlap each other, the received signal can be divided using a generally-known filtering process.

In the first embodiment, the signal has been referred to as a single signal. On the other hand, in this embodiment, a group of divided signals are processed in one unit. The estimating of the transmission path characteristics and the compensating of the signals are accomplished likewise the above.

In this embodiment, a group of demodulated data signals themselves are not data signals to be transmitted from a transmitter. Hence, the group of demodulated data signals are parallel-serial converted, thereby to obtain a transmission data signal.

In this embodiment, the known multi-carrier communications, specifically the OFDM (Orthogonal Frequency Division Multiplexing) communications, is expanded with ease, thus realizing a communications technique for transmitting a large amount of data.

Experimental Result

Figure 6:
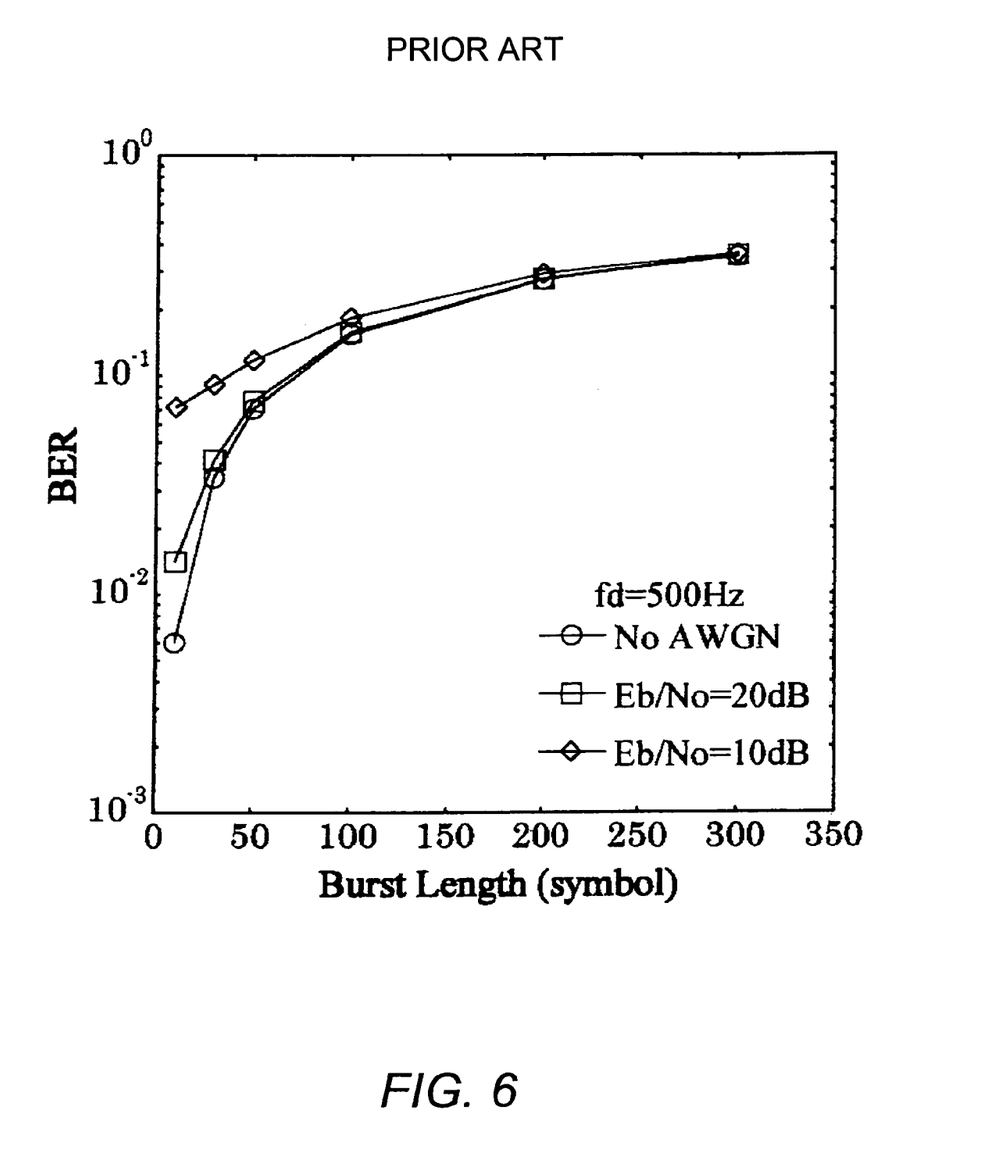
FIG. 6 is a graph showing an experimental result showing the relationship between a frame length and bit error rate, which is obtained in accordance with a conventional technique.
Figure 7:
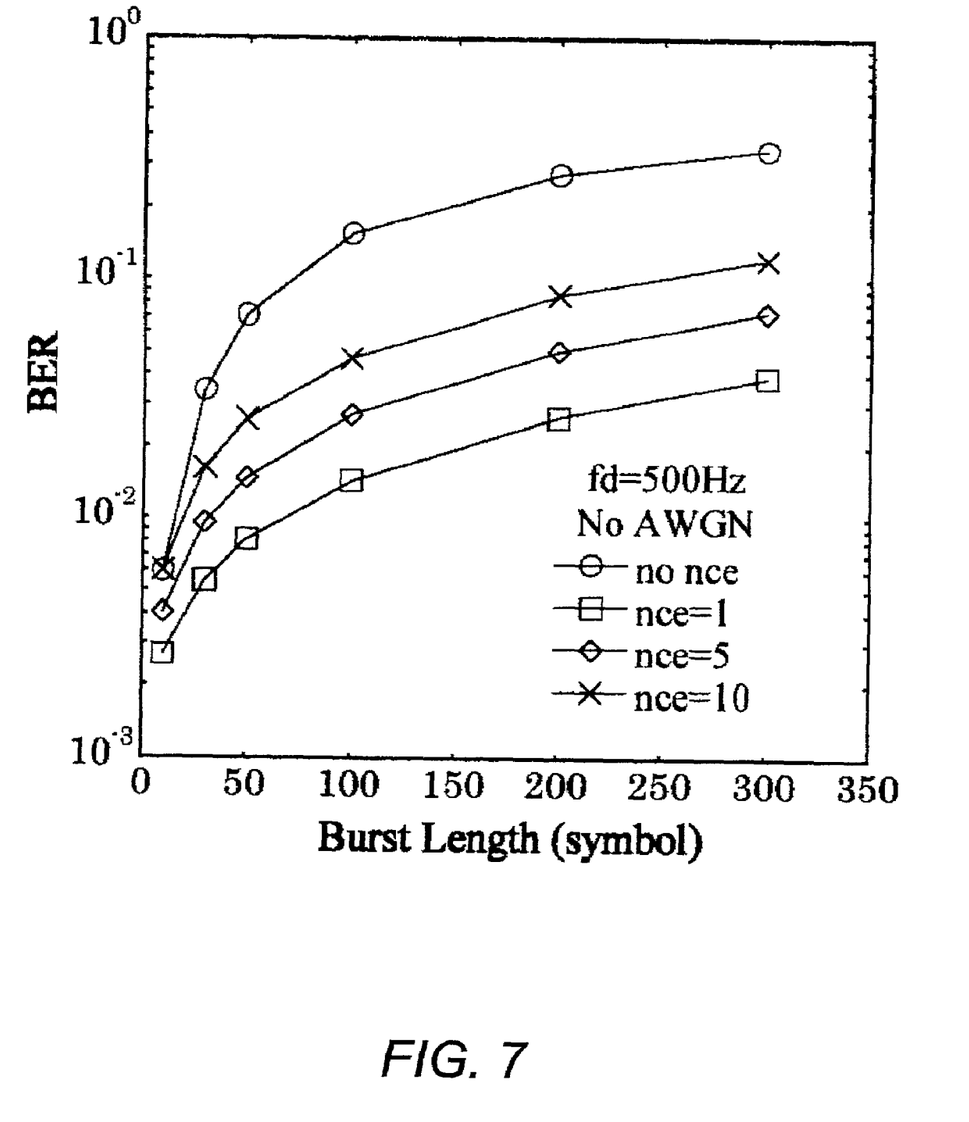
FIG. 7 is a graph showing an experimental result showing the relationship between a frame length and bit error rate, which is obtained in accordance with a technique of the present invention.

FIG. 6 is a graph showing a result of an experiment processed using a computer, specifically showing the relationship between a frame length and bit error rate in the case where data is transmitted in accordance with a conventional technique. FIG. 7 is a graph showing a result of an experiment processed using a computer, specifically showing the relationship between a frame length and bit error rate in the case where data is transmitted in accordance with a technique of the present invention. In these graphs, the horizontal axis shows the frame length (burst length), whereas the vertical axis shows the bit error rate.

As shown in FIG. 6, the larger the frame length, the more the bit error rate. In the case where the frame length is 300 bits, the experimental result shows that almost 50 percent of transmission data is not satisfactorily transmitted, as a result of a transmission error.

On the other hand, as shown in FIG. 7, according to the technique of the present invention, the bit error rates of data transmission differ from each other, depending on compensation intervals (denoted by "nce" in the graph, and corresponding to the above-described value "L") at which the data is compensated. The important thing in this experimental result is that the bit error rates are all less than 10 percent and obviously lower than the bit error rates in the case of data transmission according to the conventional technique.

Various embodiments and changes may be made thereonto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2000-154177 filed on May 25, 2000, and including specification, claims, drawings and summary. The disclosure of the above Japanese Patent Application is incorporated herein by reference in its entirety.

What is claimed is:

1. A receiver comprising:
   a receiving section which receives a resultant signal obtained by transmitting a transmission signal obtained by modulating a signal including a known signal and a data signal successively, and outputs the received resultant signal as a received signal;
   an estimation section which estimates transmission path characteristics;
   a compensation section which compensates for a portion of the received signal which corresponds to the data signal, and outputs the compensated signal as a compensated data signal;
   a demodulation section which demodulates the compensated data signal, and outputs the demodulated signal as a demodulated data signal; and
   a modulation section which modulates the demodulated data signal, and outputs the modulated signal as a modulated data signal, and
   wherein said estimation section
      (a) compares a portion of the received signal which corresponds to the known signal with a resultant signal obtained by modulating the known signal, and
      (b) compares a portion of the received signal which corresponds to the data signal with a portion of the modulated data signal which corresponds to the data signal, thereby to estimate the transmission path characteristics, and
   said compensation section compensates for a portion of the received signal, which corresponds to the data signal, using the transmission path characteristics which are estimated by comparing a preceding portion of the received signal with the resultant signal corresponding to the preceding portion of the received signal.

2. The receiver according to claim 1, wherein a portion of the received signal which has not yet been compensated is compensated using a portion of the transmission path characteristics which have already been estimated.

3. The receiver according to claim 1, wherein said estimation section outputs impulse responses which are obtained by performing (a) and (b), as transmission path characteristics.

4. The receiver according to claim 1, wherein:
said modulation section modulates the known signal, and outputs the modulated signal as a modulated-known signal; and
said estimation section performs (a) and (b), using the modulated-known signal, as a resultant signal obtained by modulating the known signal.

5. A receiver comprising:
a receiving section which receives a resultant signal obtained by transmitting a transmission signal obtained by modulating a signal including a known signal and a data signal successively, and outputs the received resultant signal as a received signal;
an estimation section which estimates transmission path characteristics;
a compensation section which compensates for a portion of the received signal which corresponds to the data signal, and outputs the compensated signal as a compensated data signal;
a demodulation section which demodulates the compensated data signal, and outputs the demodulated signal as a demodulated data signal; and
a modulation section which modulates the demodulated data signal, and outputs the modulated signal as a modulated data signal, and
wherein said estimation section
  (a) compares a portion of the received signal which corresponds to the known signal with a resultant signal obtained by modulating the known signal, and
  (b) compares a portion of the received signal which corresponds to the data signal with a portion of the modulated data signal which corresponds to the data signal, thereby to estimate the transmission path characteristics;
wherein the transmission signal is obtained by modulating the signal including the known signal and the data signal, using a multi-carrier transmission technique, and said receiver:
further comprises a divider which divides the received signal at each carrier frequency according to the multi-carrier transmission technique, and outputs the divided signals as a group of received signals, and;
uses the group of received signals in place of the received signal, a group of compensated data signals in place of the compensated data signal, a group of demodulated data signals in place of the demodulated data signal, a group of modulated data signals in place of the modulated data signal, and a number of the group of compensated data signals, demodulated data signals and modulated data signals being equal to or smaller than a number of the group of received signals.

6. The receiver according to claim 5, wherein:
carrier frequencies according to the multi-carrier transmission technique overlap each other; and
said divider divides the received signal using FFT (Fast Fourier Transformation).

7. The receiver according to claim 5, further comprising an output section which restores a data signal included in the transmission signal before being modulated, to its original signal using the group of demodulated data signals, and outputs the demodulated data signal as a transmission data signal.

8. A method for receiving a data signal, comprising the steps of:
receiving a resultant signal obtained by transmitting a transmission signal obtained by modulating a signal including a known signal and a data signal successively, and outputting the received signal as a received signal;
estimating transmission path characteristics;
compensating for a portion of the received signal which corresponds to the data signal, and outputting the compensated portion as a compensated data signal;
demodulating the compensated data signal, and outputting the demodulated data signal as a demodulated data signal; and
modulating the demodulated data signal, and outputting the modulated signal as a modulated data signal, and
wherein said step of estimating the transmission path characteristics includes the steps of
  (a) comparing a portion of the received signal which corresponds to the known signal with a resultant signal which is obtained by modulating the known signal, and
  (b) comparing a portion of the received signal which corresponds to the data signal with a portion of the modulated data signal which corresponds to the data signal, thereby estimating the transmission path characteristics, and
in said compensation step, compensating for a portion of the received signal, which corresponds to the data signal, using the transmission path characteristics which are estimated by comparing a preceding portion of the received signal with the resultant signal corresponding to the preceding portion of the received signal.

9. The method according to claim 8, wherein a portion of the received signal which has not yet been compensated is compensated using a portion of the transmission path characteristics which have already been estimated.

10. The method according to claim 8, wherein said step of estimating the transmission path characteristics includes a step of outputting impulse responses which are obtained by performing the steps (a) and (b), as transmission path characteristics.

11. The method according to claim 8, wherein:
said step of modulating includes a step of modulating the known signal and a step of outputting the modulated known signal as a modulated signal; and
said step of estimating includes the steps (a) and (b), while using a resultant signal which is obtained by modulating the known signal.

12. A method for receiving a data signal, comprising the steps of:
receiving a resultant signal obtained by transmitting a transmission signal obtained by modulating a signal including a known signal and a data signal, and outputting the received resultant signal as a received signal;
estimating transmission path characteristics;
compensating for a portion of the received signal which corresponds to the data signal, and outputting the compensated signal as a compensated data signal;
demodulating the compensated data signal, and outputting the demodulated signal as a demodulated data signal, and
modulating the demodulated data signal, and outputting the modulated signal as a modulated data signal, and wherein said step of estimating the transmission path characteristics includes the steps of:
(a) comparing a portion of the received signal which corresponds to the known signal with a resultant signal obtained by modulating the known signal, and
(b) comparing a portion of the received signal which corresponds to the data signal with a portion of the modulated data signal which corresponds to the data signal, thereby estimating the transmission path characteristics;

wherein the transmission signal is obtained by modulating a signal including a known signal and a data signal, using a multi-carrier transmission technique, and wherein said method further comprises a step of dividing the received signal at each carrier frequency, using the multi-carrier transmission technique, and outputting the divided signals as a group of received signals, and uses the group of received signals in place of the received signal, a group of compensated data signals in place of the compensated data signal, a group of demodulated data signals in place of the demodulated data signal, a group of modulated data signals in place of the modulated data signal, and a number of the groups of compensated data signals, demodulated data signals and modulated data signals being equal to or smaller than a number of the group of received signals.

13. The method according to claim 12, wherein:
carrier frequencies according to the multi-carrier transmission technique overlap each other; and
said step of dividing includes a step of dividing the received signal using FFT (Fast Fourier Transformation).

14. The method according to claim 12, further comprising a step of restoring a data signal included in the transmission signal before being modulated, to its original signal using the group of demodulated data signals, and outputting the demodulated data signal as a transmission data signal.

15. A computer readable information recording medium which records a program which makes a computer function as:
a receiving section which receives a resultant signal obtained by transmitting a transmission signal obtained by modulating a signal including a known signal and a data signal successively, and outputs the received signal as a received signal;
an estimation section which estimates transmission path characteristics;
a compensation section which compensates for a portion of the received signal which corresponds to the data signal, and outputs the compensated portion as a compensated data signal;
a demodulation section which demodulates the compensated data signal, and outputs the demodulated signal as a demodulated data signal; and
a modulation section which modulates the demodulated data signal, and outputs the modulated signal as a modulated data signal, and
wherein said estimation section
(a) compares a portion of the received signal which corresponds to the known signal with a resultant signal obtained by modulating the known signal, and
(b) compares a portion of the received signal which corresponds to the data signal with a portion of the modulated data signal which corresponds to the data signal, thereby to estimate the transmission path characteristics, and said compensation section compensates for a portion of the received signal, which corresponds to the data signal, using the transmission path characteristics which are estimated by comparing a preceding portion of the received signal with the resultant signal corresponding to the preceding portion of the received signal.

16. The information recording medium according to claim 15, wherein said program controls the computer to function for compensating for a portion of the received signal which has not yet been compensated using a portion of the transmission path characteristics which have already been estimated.

17. The data information recording medium according to claim 15, wherein said program controls said estimator to output impulse responses which are obtained by performing (a) and (b), as the transmission path characteristics.

18. The information recording medium according to claim 15, said program controls:
said modulation section to modulate the known signal and output the modulated signal as a modulated-known signal; and
said estimation section performs (a) and (b), using the modulated-known signal as a resultant signal obtained by modulating the known signal.

19. A computer readable information recording medium which records a program which makes a computer function as:
a receiving section which receives a resultant signal obtained by transmitting a transmission signal obtained by modulating a signal including a known signal and a data signal successively, and outputs the received resultant signal as a received signal;
an estimation section which estimates transmission path characteristics;
a compensation section which compensates for a portion of the received signal which corresponds to the data signal, and outputs the compensated signal as a compensated data signal;
a demodulation section which demodulates the compensated data signal, and outputs the demodulated signal as a demodulated data signal, and
a modulation section which modulates the demodulated data signal, and outputs the modulated signal as a modulated data signal, and
wherein said estimation section
(a) compares a portion of the received signal which corresponds to the known signal with a resultant signal obtained by modulating the known signal, and
(b) compares a portion of the received signal which corresponds to the data signal with a portion of the modulated data signal which corresponds to the data signal, thereby to estimate the transmission path characteristics;
the transmission signal is obtained by modulating a signal including a known signal and a data signal, using a multi-carrier transmission technique; and
and said program further controls the computer to function as a divider which divides the received signal at each carrier frequency according to the multi-carrier transmission technique, and outputs the divided signals as a group of received signals, and
uses the group of received signals in place of the received signal, a group of compensated data signals in place of the compensated data signal, a group of demodulated data signals in place of the demodulated data signal, a group of modulated data signals in place of the modulated data signal, and a number of the groups of compensated data signals, demodulated data signals and modulated data signals being equal to or smaller than a number of the group of received signals.

20. The information recording medium according to claim 19, wherein:
carrier frequencies according to the multi-carrier transmission technique overlap each other; and
said program controls said divider to divide the received signal using an FFT (Fast Fourier Transformation) technique.

21. The information recording medium according to claim 19, wherein said program controls the computer to function as an output section which restores a data signal included in the transmission signal before being modulated, to its original signal using the group of demodulated data signals, and outputs the demodulated data signal as a transmission data signal.

22. The information recording medium according to claim 15, wherein said medium is a compact disk, floppy disk, hard disk, magneto-optical disk, digital video disk, magnetic tape, or semiconductor memory.

* * * * *